United States Patent
Woodruff et al.

(10) Patent No.: US 9,816,208 B2
(45) Date of Patent: Nov. 14, 2017

(54) SELF-WRAPPABLE EPTFE TEXTILE SLEEVE AND METHOD OF CONSTRUCTION THEREOF

(71) Applicant: Federal-Mogul Powertrain Corporation, Southfield, MI (US)

(72) Inventors: Alexa A. Woodruff, Philadelphia, PA (US); Cassie M. Malloy, Trappe, PA (US); Ming-Ming Chen, West Chester, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 577 days.

(21) Appl. No.: 14/209,563

(22) Filed: Mar. 13, 2014

(65) Prior Publication Data

US 2014/0273698 A1    Sep. 18, 2014

Related U.S. Application Data

(60) Provisional application No. 61/778,736, filed on Mar. 13, 2013.

(51) Int. Cl.
*D03D 1/00* (2006.01)
*D03D 15/04* (2006.01)
(Continued)

(52) U.S. Cl.
CPC ......... *D03D 1/0035* (2013.01); *D03D 1/0041* (2013.01); *D03D 15/04* (2013.01);
(Continued)

(58) Field of Classification Search
CPC ............................. D03D 1/0041; D03D 15/04
(Continued)

(56) References Cited

U.S. PATENT DOCUMENTS 5,549,966 A    8/1996    Sassa
5,571,605 A    11/1996    Abrams et al.
(Continued)

FOREIGN PATENT DOCUMENTS

CN         1216585 A      5/1999
CN      101052760 A     10/2007
(Continued)

OTHER PUBLICATIONS

"EPTFE Fiber Solution" W.L. Gore & Associates, Inc. Elkton, MD. 2009.*
(Continued)

*Primary Examiner* — Jenna Johnson
(74) *Attorney, Agent, or Firm* — Robert L. Stearns; Dickinson Wright, PLLC

(57) ABSTRACT

A self-wrapping textile sleeve that is abrasion, arc and water resistant and method of construction thereof is provided. The sleeve includes a wall having opposite edges extending in a lengthwise direction along a central longitudinal axis of the sleeve between opposite ends. The opposite edges overlap one another to form an inner tubular cavity. The wall has warp yarns extending in the lengthwise direction generally parallel to the central longitudinal axis and weft yarns extending generally transversely to the longitudinal axis between the opposite edges. The warp and weft yarns include expanded PTFE yarns, and the weft yarns further include heat-settable thermoplastic yarns. The heat-settable polymeric yarns impart a bias on the wall to bring the opposite edges into their overlapping relation.

16 Claims, 2 Drawing Sheets

(51) Int. Cl.
*H02G 3/04* (2006.01)
*D03D 15/10* (2006.01)
*H02G 15/18* (2006.01)

(52) U.S. Cl.
CPC ........... *D03D 15/10* (2013.01); *H02G 3/0481* (2013.01); *D10B 2321/042* (2013.01); *D10B 2401/041* (2013.01); *H02G 15/18* (2013.01); *Y10T 442/3976* (2015.04)

(58) Field of Classification Search
USPC .................................................. 442/301, 209
See application file for complete search history.

(56) References Cited

U.S. PATENT DOCUMENTS

| | | |
|---|---|---|
| 5,591,526 A | 1/1997 | Abrams et al. |
| 5,667,611 A | 9/1997 | Sassa |
| 6,668,868 B2 | 12/2003 | Howland et al. |
| 6,730,622 B2 | 5/2004 | Curro et al. |
| 6,884,494 B1 | 4/2005 | Curro et al. |
| 7,037,569 B2 | 5/2006 | Curro et al. |
| 7,220,332 B2 | 5/2007 | Curro et al. |
| 7,538,276 B2 | 5/2009 | Narumi |
| 8,177,834 B2 | 5/2012 | Carlson et al. |
| 2001/0004481 A1 | 6/2001 | Hess et al. |
| 2002/0104576 A1 | 8/2002 | Howland |
| 2005/0136255 A1* | 6/2005 | Gladfelter ................ D01F 8/12 428/375 |
| 2006/0016507 A1 | 1/2006 | Baer |
| 2008/0164060 A1 | 7/2008 | Burland |
| 2009/0218002 A1* | 9/2009 | Kashihara ............ D03D 1/0041 139/433 |
| 2012/0037263 A1* | 2/2012 | Malloy .................... D03D 3/00 139/387 R |
| 2012/0204387 A1 | 8/2012 | Carlson et al. |

FOREIGN PATENT DOCUMENTS

| | | |
|---|---|---|
| CN | 102007239 A | 4/2011 |
| FR | 2881054 A1 | 7/2006 |
| GB | 2427746 A | 1/2007 |
| WO | 9732067 A1 | 9/1997 |

OTHER PUBLICATIONS

Lord, Peter R., Handbook of Yarn Production. CRC Press, Boca Raton, FL. 2003. pp. 56-62.*
International Search Report dated Jul. 22, 2014 (PCT/US2014/025258).
Clough, Norman E., Innovations in ePTFE fiber technology: capabilities, applications, opportunities, Technical Textiles/Technische Textilen, vol. 52, Issue 4, pp. 161-165, Sep. 2009.

* cited by examiner

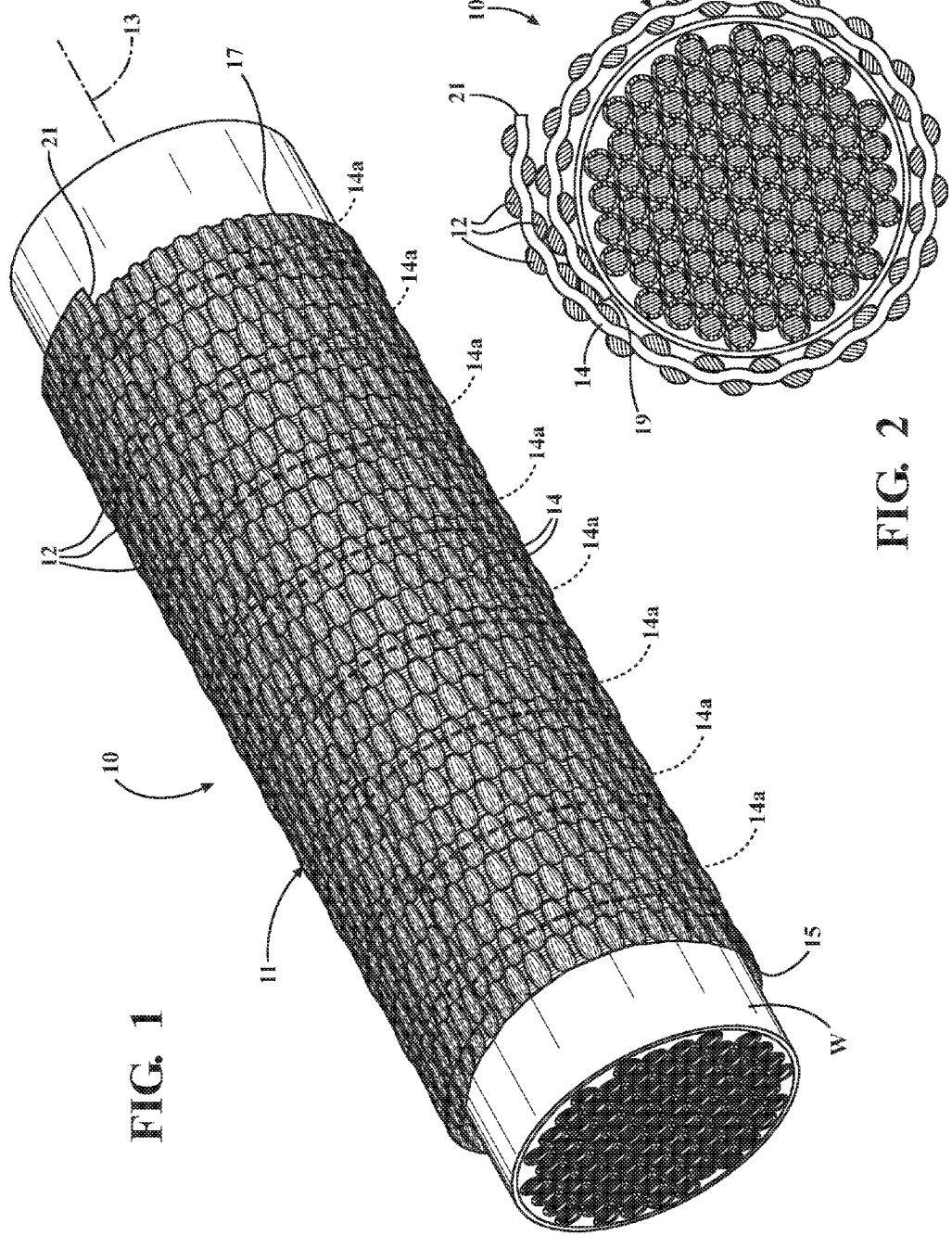

SELF-WRAPPABLE EPTFE TEXTILE SLEEVE AND METHOD OF CONSTRUCTION THEREOF

CROSS-REFERENCE TO RELATED APPLICATION

This application claims the benefit of U.S. Provisional Application Serial No. 61/778,736, filed Mar. 13, 2013, which is incorporated herein by reference in its entirety.

BACKGROUND OF THE INVENTION

1. Field of the Invention

This invention relates generally textile sleeves of the general type used to wrap wire harnesses, tubing, pipes, hoses and similar elongate structures in automotive, aerospace and other applications to protect them against abrasion, provide arc resistance and improve water repellency, and more particularly to self-wrapping textile sleeves having opposite edges biased into overlapping relation with one another to protect such items and to their method of construction.

2. Related Art

Self-wrapping textile sleeves that are known for use in aerospace applications to provide abrasion resistance, arc resistance and water repellency typically include a base woven textile fabric structure that is chemically treated or coated with MFA (perflouroalkoxy) to achieve the desired properties. While effective, the need for special coatings to provide the protection desired adds to the cost, weight and complexity of making such sleeves.

SUMMARY OF THE INVENTION

A self-wrapping textile sleeve that is abrasion, arc and water resistant without the need for any chemical treatments or coatings is provided. The sleeve includes a wall having opposite edges extending in a lengthwise direction along a central longitudinal axis of the sleeve between opposite ends. The opposite edges overlap one another to form an inner tubular cavity. The wall has warp yarns extending in the lengthwise direction generally parallel to the central longitudinal axis and weft yarns extending generally transversely to the longitudinal axis between the opposite edges. The warp and weft yarns include expanded PTFE yarns, and the weft yarns further include heat-settable thermoplastic yarns to allow the wall to be heat-set into a self-wrapping configuration. The heat-settable thermoplastic yarns, upon being heat-set, impart a bias on the wall to bring the opposite edges into their overlapping relation.

In accordance with another aspect of the invention, 100% of the warp yarns are expanded PTFE yarns.

In accordance with another aspect of the invention, between about 80-95% of the weft yarns are expanded PTFE yarns.

In accordance with another aspect of the invention, between about 5-20% of the weft yarns are heat-settable thermoplastic yarns to allow the wall to be heat-set into a self-wrapping configuration.

In accordance with another aspect of the invention, the heat-settable weft yarns are spaced from one another by a plurality of the expanded PTFE weft yarns, such that a minimum amount of heat-settable weft yarns are incorporated to impart the self-wrapping bias into the wall of the sleeve.

In accordance with another aspect of the invention, the expanded PTFE yarns are twisted to enhance to the abrasion resistance and improve resistance to fibrillation.

In accordance with another aspect of the invention, a method of constructing a self-wrapping textile sleeve that is abrasion, arc and water resistant without the need for any chemical treatments or coatings is provided.

In accordance with another aspect of the invention, a method of constructing a self-wrapping textile sleeve that is abrasion, arc and water resistant is provided. The method includes providing expanded PTFE yarn and heat-settable thermoplastic yarn. Further, weaving warp yarns from the expanded PTFE yarn that extend generally parallel to a central longitudinal axis of the sleeve with weft yarns from both the expanded PTFE yarn and heat-settable thermoplastic yarn that extend generally transversely to the longitudinal axis to form a wall having opposite edges that extend along the central longitudinal axis between opposite ends. Further, wrapping the wall to bring the opposite edges into overlapping relation with one another, and then, heat-setting the heat-settable thermoplastic weft yarns to impart a bias within the wall to bias the opposite edges toward their overlapped relation.

Such a sleeve has the advantage of being abrasion, arc and water resistant without the need for any chemical treatments or coatings. Accordingly, the sleeve is 100% textile (woven yarn) with no coating or special treatment. Further, the predominant use of ePTFE makes the sleeve light weight and also sufficiently flexible to enable it to be self-wrappable.

BRIEF DESCRIPTION OF THE DRAWINGS

These and other objects, features, and benefits of the present invention will be readily appreciated, as the same becomes better understood by reference to the following detailed description when considered in connection with the accompanying drawings, wherein:

FIG. 1 is a perspective view of a self-wrapping sleeve constructed in accordance with one presently preferred embodiment of the invention;

FIG. 2 is a cross-sectional view of the sleeve of FIG. 1;

DETAILED DESCRIPTION OF PRESENTLY PREFERRED EMBODIMENTS

Figure 3:
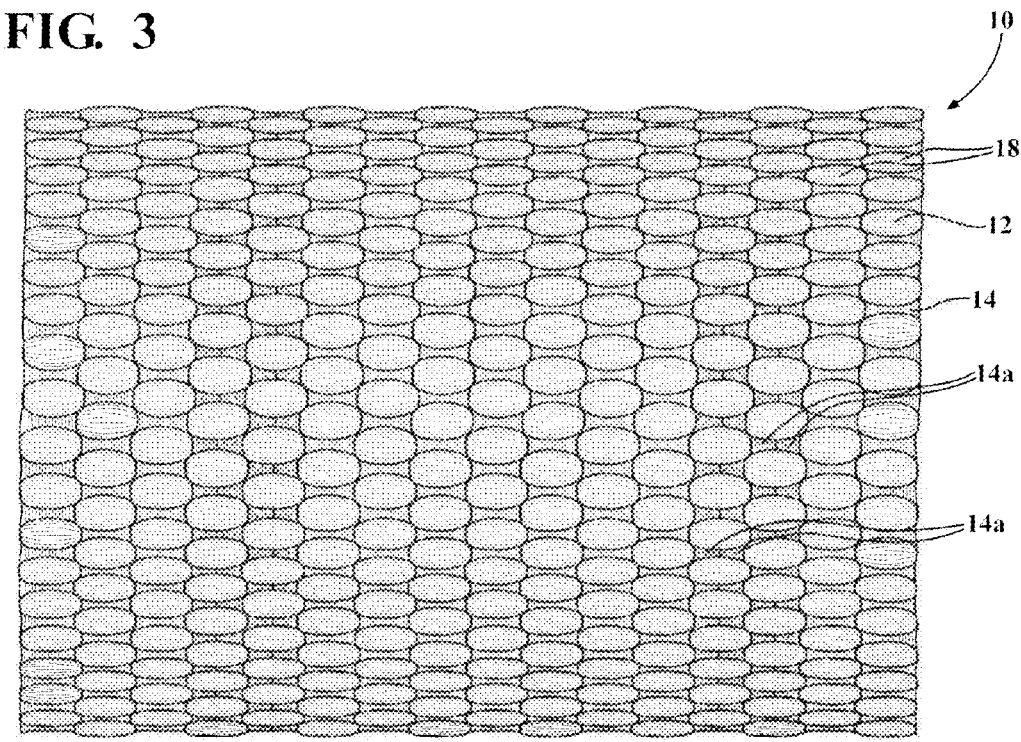
FIG. 3 is a fragmentary plan view of a wall of the sleeve of FIG. 1.

Referring in more detail to the drawings, FIG. 1 illustrates a self-wrapping, also referred to as self-curling sleeve 10, constructed in accordance with one aspect of the invention. The sleeve 10 has a woven wall 11 fabricated principally from expanded polytetrafluoroethylene (ePTFE) yarns. The woven sleeve 10 includes yarns extending in a lengthwise direction generally parallel to a central longitudinal axis 13 between opposite ends 15, 17, which are referred to hereafter as warp yarns 12, and yarns extending in a crosswise direction generally transversely to the longitudinal axis 13 between opposite edges 19, 21, which are referred to hereafter as weft or fill yarns 14.

Figure 4:
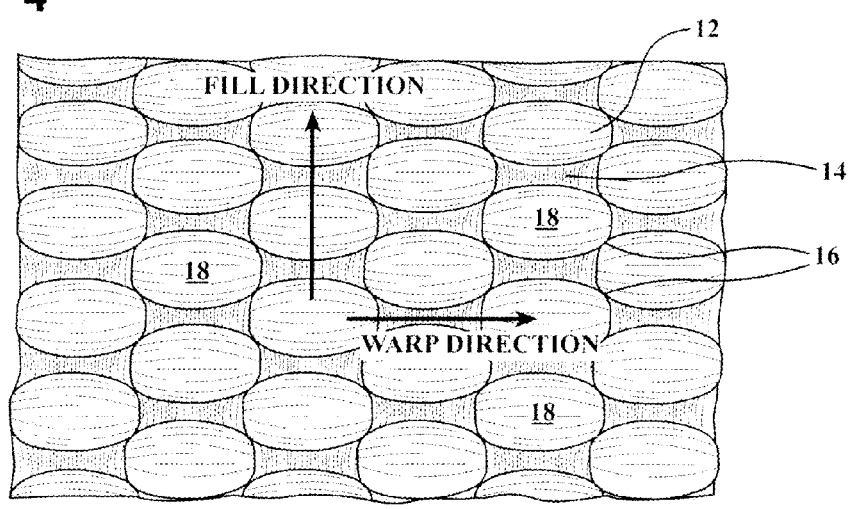
FIG. 4 is an enlarged encircled portion 4 of FIG. 3.

The warp yarns 12 are preferably provided entirely (100%) of ePTFE yarns. At least a majority of the weft yarns 14 are ePTFE, and more particularly, between about 80 to 95% of the weft yarns 14 are ePTFE. As best shown in FIG. 4, the balance of the fill yarns that aren't ePTFE are heat-settable thermoplastic yarns 14a, which may be monofilament yarns fabricated, for example, from polyester, PPS (polyphenylene sulfide) or other heat-settable thermoplastics common in the art or which may be later discovered. One of the main objectives of the construction of the sleeve 10 is to provide as nearly to a 100% ePTFE woven sleeve structure as possible, with only a minimum amount of heat-settable yarns, also referred to as heat-settable yarns 14a, needed to form the otherwise all ePTFE substrate into a self-wrapping finished sleeve 10. Incorporating 5 to 20% of the heat-settable fill yarns 14a fill into the woven structure of the ePTFE yarns enables the woven ePTFE substrate material to be heat-set into a self-wrapping tubular profile using heat.

ePTFE is selected as the principal material for the warp and fill yarns 12, 14 because of its low arc track properties, low coefficient of friction, low water absorption, low flammability, low weight, good chemical resistance, good abrasion resistance, and high thermal resistance. The expanded nature of the selected ePTFE yarns is selected because it has a lower density than regular, non-expanded PTFE. Additionally, the ePTFE yarn is formed with air pockets in the structure resulting in a yarn that is flexible and highly conformable, and thus, the ePTFE yarns conform closely to the shape of the weave structure that it has been woven into. When the ePTFE yarn conforms closely to the weave structure, it becomes compacted in the interlacing regions 16 (see FIGS. 3 and 4) and remains expanded in the floating regions 18. The expanded floating regions 18 are compressed and compacted at interlace sites 16, and thereby have the beneficial effect of closing up the regions in which gaps or holes tend to form in prior art woven fabrics, through which water could otherwise penetrate. As such, the woven ePTFE yarns 12, 14 result in a highly water-repellant fabric that resists penetration of water droplets. Stated another way, if not for the expanded floating regions 18 adjacent the compressed interlace sites 16, the presence of gaps or openings would be increased, thereby reducing the effectiveness against water penetration. It is thus the combination and synergy of weave structure (simple weave pattern), density, and yarn selection (ePTFE) that contributes to the tight, closely woven water repellant structure.

A plain weave structure, which has definite meaning and is well understood in the art, is preferred over other, more open patterns, for achieving a self-wrapping ePTFE sleeve with low water absorption, low arc track, and good abrasion resistance.

The percent of non-ePTFE material (i.e., the heat-settable yarn 14a) is kept purposely low, and as low as possible, to minimize the presence of non-ePTFE yarn 14a. The heat-settable non-ePTFE yarns 14a, while necessary to impart the self-wrapping profile to the sleeve 10, have a lower temperature resistance and much lower arc resistance as compared to the ePTFE yarns 14. As such, keeping the non-ePTFE material to a minimum decreases the chances of the non-ePTFE yarns 14b allowing any current to track or arc through the fabric sleeve 10 via the non-ePTFE yarns 14a. FIG. 3 best illustrates the incorporation of the heat-settable non-ePTFE yarns 14a into the woven ePTFE fabric wall 11. The pattern and spacing of the non-ePTFE yarns 14a from one another is for purposes of illustration only, and it will be understood that while double strands of monofilaments of the non-ePTFE yarns 14a are shown, such that two stands of the non-ePTFE yarns 14a are woven abutting one another in a dual insertion pattern, and that there are two such immediately adjacent rows of such double-strand monofilament, is not limiting. For example, each row may contain only a single strand of monofilament non-ePTFE yarn 14a. Regardless of the number of non-ePTFE yarns 14a provided in a row, whether a single strand or dual inserted, double set of strands, the rows of monofilament non-ePTFE yarn 14a are spaced apart lengthwise from one another by a plurality or numerous weft rows of intervening ePTFE fill yarns 14 to provide the minimum content of non-ePTFE yarns 14a needed to impart the self-curling bias into the wall 11 to bring the opposite edges 19, 21 into overlapping relation with one another. This contributes to the percent contend of non-ePTFE fill yarn 14a being so much lower than the ePTFE fill yarns 14.

The ePTFE warp 12 and weft 14 yarns may be individually twisted prior to weaving to improve their abrasion resistance properties. Twisting reduces the tendency of the ePTFE yarns 12, 14 to fibrillate (form separated fibers) by concealing weak edges of the ePTFE yarns that can easily be abraded, and further has the advantage of altering the shape of the air pockets in the resulting woven fabric.

The specific gravity of the ePTFE yarns 12, 14 can be selected to be in the range of 1.0 to 2.2, and more particularly between about 1.0 to 1.5, wherein a sample was constructed having ePTFE yarns 12, 14 with a specific gravity of about 1.2. The warp and/or weft ePTFE yarns 12, 14 may be selected to have a flat yarn profile or may be selected to have a round profile. The size (denier) and shape (flat or round) may vary and combinations of different sizes and/or shapes may employed.

It will be noted that another objective of the structure of the sleeve 10 is that the desired properties are achieved by a simple, relatively low cost, low weight combination of ePTFE yarns 12, 14 coupled with a relatively small number of heat-settable fill yarns 14a and a simple plain weave pattern. There are no additional yarn types required, nor is the presence of any coating or further treatment of the fibers necessary to achieve the low arc track, low abrasion, low water absorption properties of the self-wrapping sleeve 10.

In accordance with a further aspect of the invention, a method of constructing a sleeve 10 that is abrasion, arc and water resistant, as described above, is provided. The method includes providing expanded PTFE yarn and heat-settable thermoplastic yarn. The method includes weaving warp yarns 12 with the expanded PTFE yarn that extend generally parallel to a central longitudinal axis 13 of the sleeve 10 with weft yarns 14, 14a of both the expanded PTFE yarn and heat-settable thermoplastic yarn, respectively, that extend generally transversely to the longitudinal central axis 13 to form a wall 11 having opposite edges 19, 21 that extend along the central longitudinal axis 13 between opposite ends 15, 17. Further, the method includes wrapping the wall 11 into a generally cylindrical form to bring the opposite edges 19, 21 into overlapping relation with one another. Further yet, the method includes heat-setting the heat-settable thermoplastic yarn 14a to impart a bias in the wall 11 to bias the opposite edges 17, 19 toward their overlapped relation. Accordingly, upon being heat-set, the wall 11 tends to remain in a self-wrapped, tubular configuration absent some externally applied force tending to move the opposite edges 17, 19 away from one another.

The method includes providing the warp and weft yarns 12, 14, 14a in the percentage contents and configurations discussed above, and further includes weaving the wall 11 in a plain weave pattern.

Obviously, many modifications and variations of the present invention are possible in light of the above teachings and may be practiced otherwise than as specifically described while within the scope of any ultimately allowed claims.

What is claimed is:

1. A self-wrapping textile sleeve, comprising:
a wall having opposite edges extending in a lengthwise direction along a central longitudinal axis of the sleeve between opposite ends, said opposite edges overlapping one another to form an inner tubular cavity, said wall having warp yarns extending in the lengthwise direction generally parallel to said central longitudinal axis and weft yarns extending generally transversely to said longitudinal axis between said opposite edges, said warp yarn including expanded PTFE yarns, said weft yarns including expanded PTFE yarns and heat-settable thermoplastic yarns, said heat-settable thermoplastic yarns imparting a bias on said wall to bring said opposite edges into their overlapping relation;
wherein said weft expanded PTFE yarns have a substantially uniform pick density extending from one of said opposite ends to the other of said opposite ends; and
wherein between about 5-20% of said weft yarns are heat-settable thermoplastic yarns.

2. The self-wrapping textile sleeve of claim 1 wherein 100% of said warp yarns are expanded PTFE yarns.

3. The self-wrapping textile sleeve of claim 2 wherein between about 80-95% of said weft yarns are expanded PTFE yarns.

4. The self-wrapping textile sleeve of claim 3 wherein said wall is woven having a plain weave pattern.

5. The self-wrapping textile sleeve of claim 1 wherein between about 80-95% of said weft yarns are expanded PTFE yarns.

6. The self-wrapping textile sleeve of claim 5 wherein 100% of said warp yarns are expanded PTFE yarns.

7. The self-wrapping textile sleeve of claim 5 wherein said heat-settable thermoplastic weft yarns are spaced from one another by a plurality of said expanded PTFE weft yarns.

8. The self-wrapping textile sleeve of claim 1 wherein said expanded PTFE weft yarns are twisted.

9. The self-wrapping textile sleeve of claim 1 wherein said expanded PTFE weft yarns have a specific gravity between about 1.0-2.2.

10. The self-wrapping textile sleeve of claim 9 wherein said expanded PTFE weft yarns have a specific gravity between about 1.0-1.5.

11. A method of constructing a self-wrapping textile sleeve that is abrasion, arc and water resistant, comprising:
providing expanded PTFE yarn;
providing heat-settable thermoplastic yarn,
weaving warp yarns with the expanded PTFE yarn that extend generally parallel to a central longitudinal axis of the sleeve with weft yarns of both the expanded PTFE yarn and heat-settable thermoplastic yarn that extend generally transversely to the longitudinal axis to form a wall having opposite edges that extend along the central longitudinal axis between opposite ends, and weaving about 5-20% of the weft yarns with the heat-settable thermoplastic yarns;
wrapping the wall to bring the opposite edges into overlapping relation with one another;
heat-setting the heat-settable thermoplastic yarn to impart a bias in the wall to bias the opposite edges toward their overlapped relation; and
further including weaving the weft expanded PTFE yarns having a substantially uniform pick density from one of the opposite ends to the other of the opposite ends.

12. The method of claim 11 further including weaving 100% of the warp yarns with the expanded PTFE yarns.

13. The method of claim 12 further including weaving about 80-95% of the weft yarns with the expanded PTFE yarns.

14. The method of claim 11 further including weaving the wall in a plain weave pattern.

15. The method of claim 11 further including spacing the heat-settable thermoplastic weft yarns from one another by a plurality of the expanded PTFE weft yarns.

16. The method of claim 11 further including twisting the expanded PTFE weft yarns.

* * * * *